July 4, 1933.  C. W. WOOD  1,916,548
EARTH SURFACE MIXER
Filed Feb. 21, 1931  2 Sheets-Sheet 1
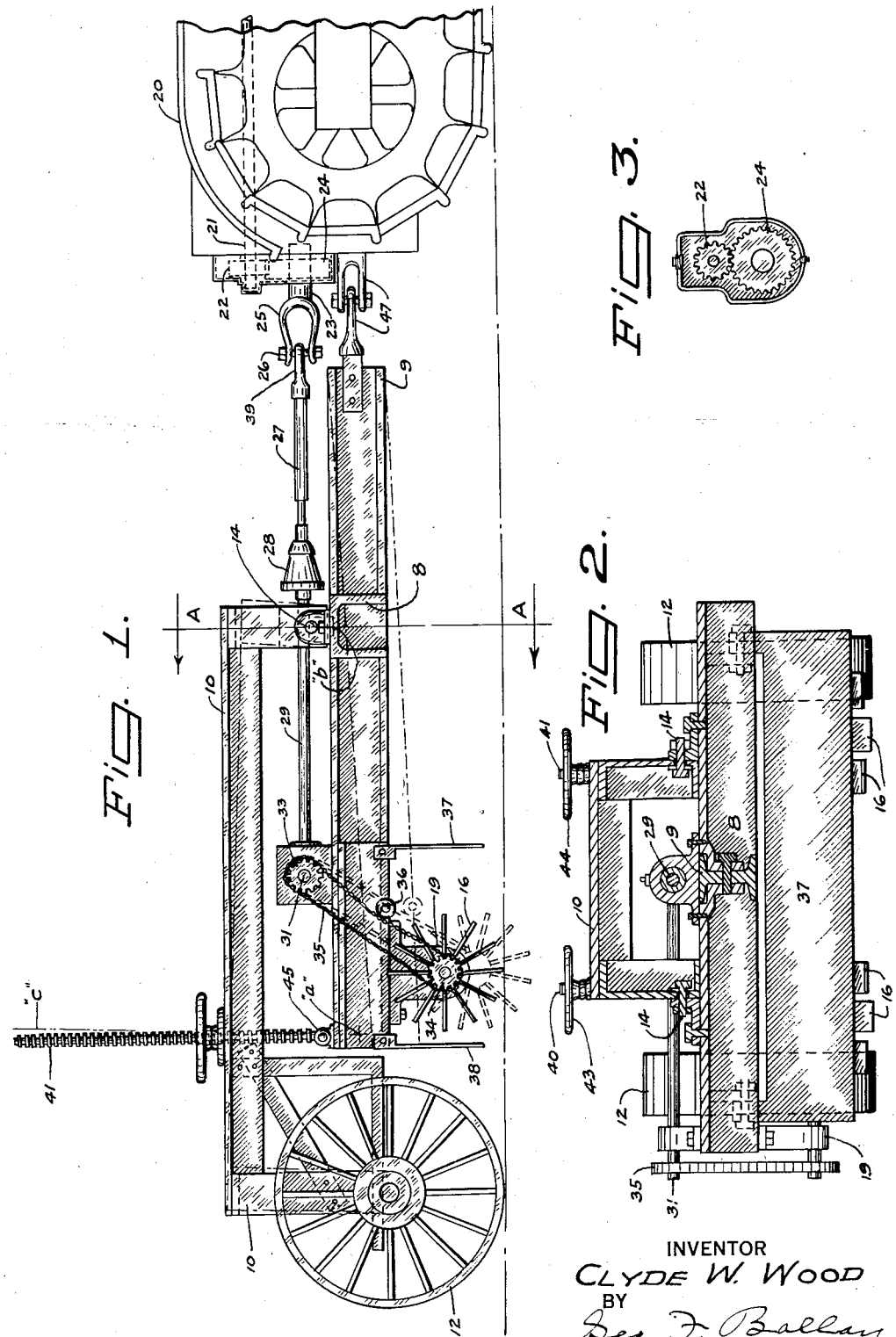
INVENTOR
CLYDE W. WOOD
BY
ATTORNEY July 4, 1933.  C. W. WOOD  1,916,548
EARTH SURFACE MIXER
Filed Feb. 21, 1931  2 Sheets-Sheet 2
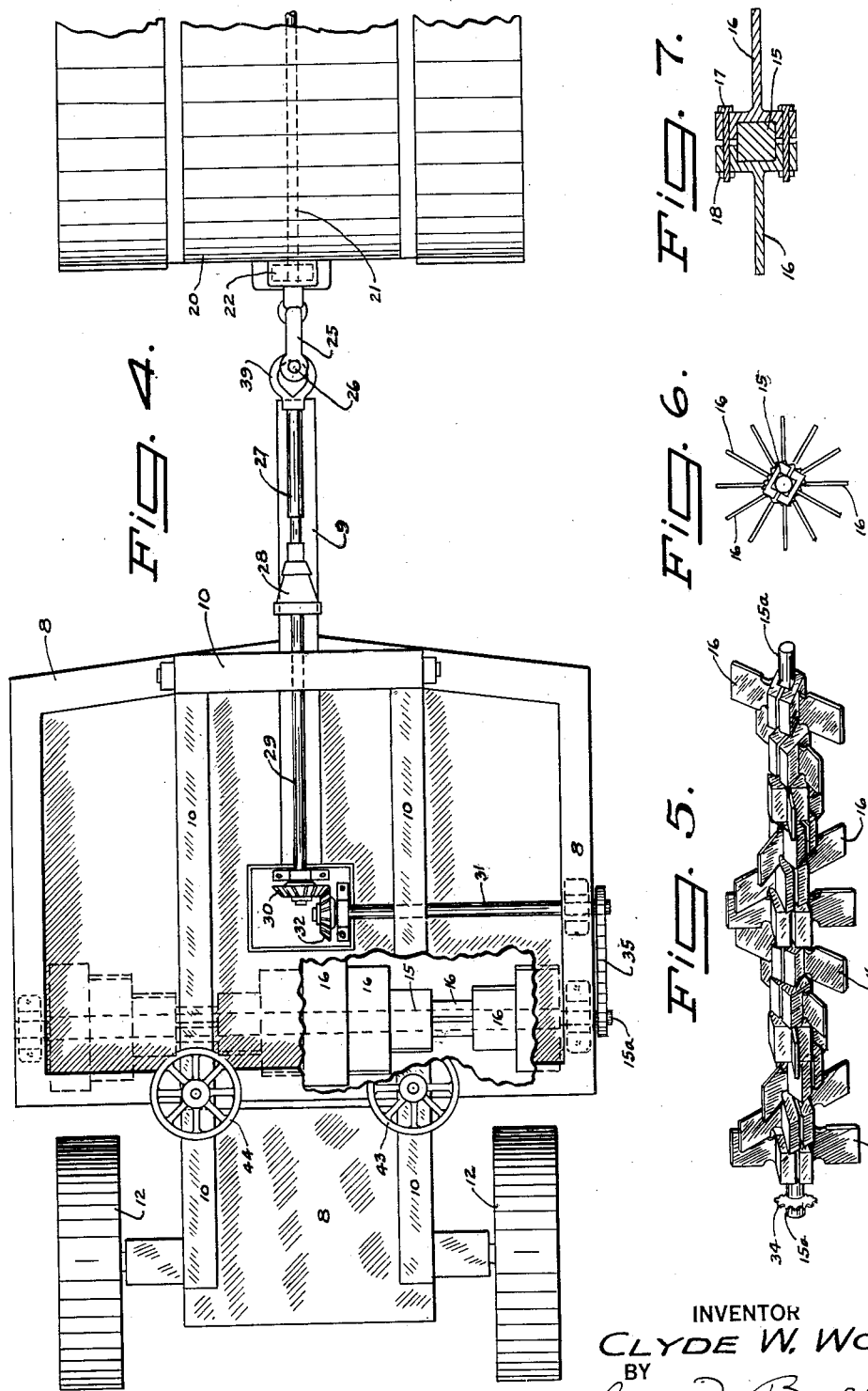
INVENTOR
CLYDE W. WOOD
BY
Geo. F. Ballay
ATTORNEY Patented July 4, 1933

1,916,548

UNITED STATES PATENT OFFICE

CLYDE W. WOOD, OF STOCKTON, CALIFORNIA

EARTH SURFACE MIXER

Application filed February 21, 1931. Serial No. 517,547.

This invention relates to a new and useful improved device for mixing road materials that are already in place on the road and to a machine which also can be used for pulverizing heavy soils preparatory to mixing same with oil, rock and other ingredients.

It is one of the objects of the invention to provide an earth surface mixer that is particularly adapted for mixing road materials and to connect the said device to a tractor and operate same directly off of the tractor drive shaft.

It is another object of the invention to provide a standard tractor for pulling and operating the device and to reduce the standard speed of the tractor to cause the device to be drawn at a speed that will produce the highest working efficiency.

It is another object of the invention to preferably construct the mixing part of the device out of a plurality of flat blades and detachably mount the said blades on a square shaft, and arrange the blades in series and stagger them at different angles on the shaft so that one or more of the different blades will always be in the soil to continuously mix same during the operation of the device.

It is another object of the invention to provide an improved method for raising and lowering the blades to different depths into the ground.

The invention further consists in the particular combination, construction and association of the different parts such as described in the following specification and possesses various other objects and features of advantage, some of which, with the foregoing, will be made manifest in the following description of the preferred form of the invention that is illustrated in the drawings accompanying and forming part of the specification.

It is to be understood that it is not intended to limit the invention to the embodiment shown by said drawings and description as variations may be adapted within the scope of the invention as set forth in the claims.

In the accompanying drawings:

Figure 1 is a longitudinal side elevational view of one type of device involving the invention.

Figure 2 is an end sectional view taken on line A—A of Figure 1 looking in direction of the arrows.

Figure 3 is a view illustrating one method of connecting the tractor drive shaft to the mixing mechanism.

Figure 4 is a top plan view of the device with a portion broken away to show the mixer.

Figure 5 is a perspective view of the mixer and illustrates the preferred form of the blades and how they are mounted on a shaft and arranged thereon at different angles with respect to each other.

Figure 6 is an end elevational view of the mixer.

Figure 7 is a cross sectional view taken through one of the blades mounted on the square shaft and shows the preferred form of construction and method of fastening the blades on the shaft.

Referring in detail to the different parts wherein like numeral characters designate like parts throughout the several views, the numeral 8 designates the lower frame that is preferably shaped as shown in Figure 4 and is provided with an I beam 9 that is arranged centrally thereon and extends in front of the frame as shown in Figure 1. Figure 2 shows the I beam bolted to the lower frame for illustration purposes, but it is to be understood that the various parts may be welded, or otherwise held together in any suitable manner. The numeral 10 designates the upper frame that is preferably made considerably narrower than the lower frame and is formed as shown in Figures 1 and 4 and is provided with a pair of wheels 12 that are revolubly mounted on the rear end thereof. The front end of the said upper frame is pivoted to the lower frame by the pins 14 as shown in Figures 1 and 2, it being understood that any suitable method may be used for pivoting the two frames together.

As hereinbefore stated, one of the objects of the present invention is to provide a plurality of flat blades and to detachably mount the blades in series on a square shaft in such a manner as to cause one or more of the different blades to be continuously in the soil during the revolving of the shaft. Figures 5 and 7 show a square shaft 15 having round end portions 15a and show a plurality of flat blades 16 that are made in halves and substantially held on to the square shaft by means of bolts and nuts 17 and 18 respectfully. It will be noted that blades are mounted on the shaft in series and arranged at different angles with respect to each other. These angles can be any suitable angle desired, the preferred arrangement being such that the blades are disposed along the shaft to form a spiral, as shown in Figure 5. The staggering of the blades, as illustrated, eliminates considerable strain on the shaft and breaks up the soil in the most efficient manner. The shaft 15 is revolubly mounted in bearings 19 that are fastened on the bottom of the lower frame 8, as shown in Figure 1.

The preferred means for revolving the shaft and blades is shown in Figures 1 and 4, showing that the device can be driven and operated with a tractor and thereby eliminate the necessity of providing an auxiliary engine to operate the mixing mechanism. The numeral 20 designates the rear portion of a tractor and the numeral 21 the motor drive shaft thereof. Another shaft 23 is revolubly supported in the rear portion of the tractor and is provided with a gear 24 that is adapted to engage with a gear 22 that is fixed on the tractor's motor drive shaft. A U shaped member 25, having an eye bolt 26, is fixed on the said shaft 23, as shown in Figure 1. A shaft 27, carrying a standard toggle joint 28, is provided, and another shaft 29 that is revolubly supported on the lower frame is connected to the toggle joint 28. A bevel gear 30 is fixed on the end of the shaft 29, as shown in Figure 4. Another shaft 31 is provided and arranged transversely on the lower frame 8 and is revolubly supported thereon and is provided with a bevel gear 32 that is adapted to engage with the bevel gear 30, as shown in Figure 4. A spur gear 33 is fixed on the outer end of the shaft 31 and another spur gear 34 is fixed on the outer end of the blade shaft 15, as shown in Figure 1. A standard chain 35 that is adapted to mesh with the said spur gears is provided and mounted on the said spur gears, as shown in Figure 1. This connects the blade shaft with the revolving mechanism that is operatively connected to the motor drive shaft of the tractor. An idler 36 is provided and revolubly mounted on the lower frame, as shown in Figure 1, to tighten the chain 35 on its respective gears. Two baffle shields 37 and 38 are provided and pivoted to the lower frame, as shown in Figure 1, to keep the soil in place while it is being mixed. The shaft 27 is connected to the U shaped member 25, as shown in Figures 1 and 4, by having a member 39 that is adapted to receive the eye bolt 26. In other words, the members 25, 26 and 39 form a yoke for connecting the shaft 27 to the shaft 23 that is operated by the motor shaft 21. From the foregoing it will be seen that when revolvable movement is imparted to the motor drive shaft 21 of the tractor, the shaft 23 will be caused to revolve, which will revolve the shafts 27, 29, 31 and the blade shaft 15, causing the blades to be continuously projected into and turned through the soil, thus mixing same.

It is necessary to provide means to raise and lower the blade shaft 15 so that the blades can be adjusted to project to different depths in the soil, when the device is in operation, and also to hold the blade shaft in its upper position so that the blades will be held entirely out of the soil when it is desired to move the device without mixing the soil. Figure 1 shows the lower frame 8 pivoted to the upper frame 10 in a manner which will permit the rear end portion of the lower frame, upon which the blade shaft is mounted, to be raised and lowered to different positions. The preferred means for raising and lowering this rear portion of the lower frame is shown as comprising two threaded rods 40 and 41 and pivoting the said rods on the rear end portion of the lower frame, as shown in Figure 1. The rods vertically extend through the upper frame and are provided with internally threaded hand wheels 43 and 44 that are arranged above the upper frame, as shown in Figure 1. The bearing 45, upon which the threaded rods are pivoted, may be welded to the lower frame or substantially fastened thereon in any suitable manner. From the foregoing it will be seen that the rear end portion of the lower frame, upon which the blade shaft and blades are mounted, is suspended on the upper frame by means of the threaded rods and the hand wheels that rest on the upper frame, and that when the said hand wheels are turned in a certain direction the rear end portion of the lower frame will be caused to be lowered, which will cause the blades to be projected into the soil to any suitable depth to mix same, and when the said hand wheels are turned in the opposite direction the rear end portion of the lower frame will be raised, which will lift the said blades upwardly to a position where they will be free from the soil. In Figure 1 there is illustrated by the dotted lines the different relative positions that the upper and lower frame and I beam and mixing mechanism will take when the lower frame is adjusted to a certain position where the blades will be projected a certain depth into the soil. In other words, when the threaded rods are adjusted to a position where the center of the bearing 45, in which they are pivoted, is lowered to the center designated by "a" the center of the pins 14, which pivot the front end of the lower frame to the upper frame, will be lowered to the center designated by "*b*" and the upper frame and lower frame and I beam and blades will be moved to the position shown dotted in Figure 1 and the center of the threaded rods will remain at right angles to the upper frame and will take the position as shown by the center line "*c*" in Figure 1. The toggle joint 28 will permit the shaft 29 to move with the I beam and lower frame without causing any strain on the shaft 27. The I beam 9 is fastened to the tractor by means of the yoke 47.

Any suitable tractor can be used to propel the device and it is very desirable to reduce the speed of a standard tractor so that it will travel approximately one mile an hour. Any suitable method of gearing may be used to reduce the speed of the tractor. In Figure 1 there is illustrated a certain method of connecting the device to the motor drive shaft of the tractor. When it is desired to disconnect the device from the motor drive shaft, the eye bolt 26 may be removed. However, it is to be understood that a standard clutch can be used to disconnect the gears. The clutch has not been shown as it involves standard practice which is not considered a part of the invention. Although it is preferable to operate the mixer off of the motor drive shaft of the tractor, it is to be understood that an auxiliary engine can be provided and mounted on one of the frames and the mixer operated by the auxiliary engine if desired.

Having thus illustrated and described a certain form of construction and arrangement of parts pertaining to the invention, it is to be understood that the frames may be built up in any suitable manner and that the various shafts and bearings may have any suitable size and shape and be arranged in any suitable position, also that any suitable method may be used for fastening the bearings and other parts in their respective positions and any suitable means be used to connect the mixer's operating shafts and/or the frame to the tractor, the present illustration not being utilized as indicating the only arrangement and form of construction into which the parts can be made, as it is desired to include in this application for Letters Patent of the United States of America, any and all patentable novelty that exists in the illustration and description disclosed and all that comes within the fundamental principle of the invention as set forth in the claims hereinafter mentioned.

What is claimed:

1. An earth surface mixer comprising a wheel supported frame, another frame pivoted on the front portion of the first mentioned frame, said second mentioned frame extending underneath the top of the first mentioned frame and toward the rear end portion thereof, an agitator for mixing soil revolubly mounted on the second mentioned frame, a threaded rod pivotally mounted on the rear end portion of the second mentioned frame and adapted to vertically extend above the top of the first mentioned frame, means for operatively connecting the agitator to a motor drive shaft, and threaded means adapted to engage with the threaded rod and to be revolubly supported on top of the first mentioned frame to raise and lower the rear portion of the second mentioned frame to vertically adjust the agitator to different positions.

2. A device for use as an earth surface mixer to be used in combination with a tractor, said device comprising a wheel supported frame, another frame pivoted on the front portion of the first mentioned frame, said second mentioned frame extending underneath the top of the first mentioned frame and toward the rear end portion thereof, an agitator for mixing soil revolubly mounted on the second mentioned frame, means between the frames to adjust the agitator supporting frame vertically, means for operatively connecting the agitator to the motor drive shaft of a tractor, a toggle joint in said means, and means for connecting the device to a tractor.

3. An earth mixer comprising a supporting frame, means for advancing the frame along the ground, a revoluble earth engaging and agitating unit supported from the frame and extending transversely of the direction of travel thereof and transverse baffle elements pivotally hung from the frame for fore and aft swinging movement and disposed ahead of and behind the agitator in spaced relation thereto, the lower ends of the elements being on a level above that of the bottom of the agitator.

4. An earth mixer comprising a frame, means directly supporting the front end of the frame from and connecting the same to a tractor, an agitator supported by said frame, another frame extending lengthwise of said first frame and pivoted at its front end thereon ahead of the agitator, wheels supporting the rear end of said other frame, and vertically adjustable connection means between said frames.

In testimony whereof, I hereunto affix my signature.

CLYDE W. WOOD.